May 28, 1940.　　　　　J. H. HILL　　　　　2,202,203

SHAVING IMPLEMENT

Filed Feb. 15, 1937

INVENTOR
John H. Hill.
BY
F. W. Kenway.
ATTORNEY

Patented May 28, 1940

2,202,203

UNITED STATES PATENT OFFICE 2,202,203

SHAVING IMPLEMENT

John H. Hill, Wollaston, Mass., assignor to Gillette Safety Razor Company, Boston, Mass., a corporation of Delaware Application February 15, 1937, Serial No. 125,709

11 Claims. (Cl. 30—43)

This invention relates to dry-shaving implements of the type which embody in their structure relatively movable shearing members. Its object in general is to improve the efficiency of such implements, particularly by increasing the interval during which the shearing members are maintained in open position, that is to say, the interval during which the shearing teeth of the members remain in registration so that in moving the implement over the face of the user the hair may freely enter and reach the shearing plane. To this end, an important feature of the invention consists in relatively movable shearing members arranged to occupy normally an open position relation, or tending automatically to assume an open position relation, in combination with actuating means for imparting a short and rapid shearing movement to one of the members during a limited portion of the cycle. For example, as herein shown, the cutter occupies an open position relation to the guard during three-quarters of the cycle and makes a complete back-and-forth shearing stroke during the remaining one-quarter of the cycle.

Another novel feature of the invention which contributes to increase the open time of the implement consists in a sectional cutter member so designed and arranged in the implement that one section thereof is operated to make its shearing movement while the other section remains at rest in open position. Accordingly, at least one-half of the implement is always in open condition and the shearing operation is effected alternately or successively in different areas of the guard or outer shearing member.

Another important feature of the invention, applicable to dry-shaving implements in general, consists in a guard plate or shearing plate having flat portions longitudinally spaced from each other by a downwardly extending corrugation or rib, the flat portions being transversely slotted to provide shearing teeth while the material of the corrugation is maintained intact. A shearing plate so constructed is thus rendered stiff both longitudinally and transversely and the effective thickness of its shearing teeth may be reduced without danger of flexing, to such a degree that the length of stubble remaining after the implement has been moved over the user's face is less than heretofore.

My invention includes also various features of improved mechanical detail in the construction of the cutter sections and in the mechanism for supporting and vibrating them.

These and other features of the invention will be best understood and appreciated from the following description of a preferred embodiment thereof, selected for purposes of illustration and shown in the accompanying drawing, in which.

Figure 1:
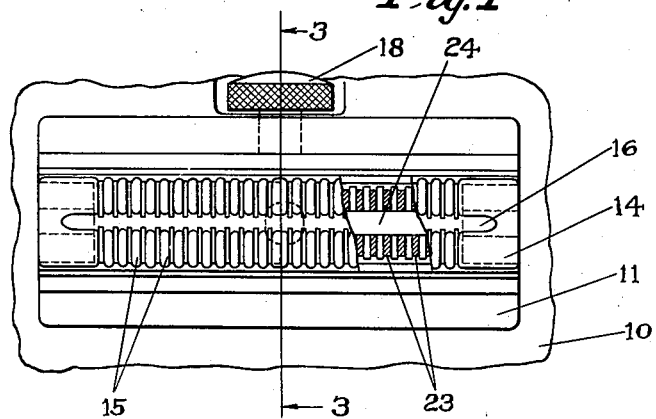
Fig. 1 is an end view of the implement on an enlarged scale, showing a portion of the guard plate and underlying cutter broken away.
Figure 2:
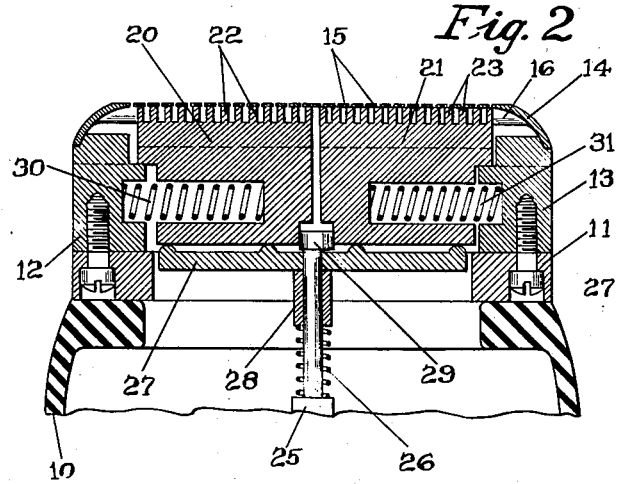
Fig. 2 is a view in longitudinal section on the broken line 2—2 of Fig. 3.

The implement includes in its structure a casing 10 of "Bakelite" or other mouldable material which is formed to serve as a handle for the implement and also as a housing for a small motor, not herein illustrated. The upper end of the casing 10 is recessed to receive the cutting head of the implement which is retained in place by a thumb screw 18 threaded into one side of the casing.

The cutting head comprises an elongated U-shaped member 11 which is located in the socket of the casing with its open side outermost, being engaged at one face by the clamping screw 18. The ends of the member 11 are closed by end plates or blocks 12 and 13 and longitudinally undercut guideways extend continuously throughout the length of the inner upper edges of the side portions of the member 11 and of the end plates. The guard plate 14 is formed with inclined side walls arranged to fit in these guideways so that the guard plate as a whole may be slipped longitudinally into place. After the guard plate has been assembled in its position in the member 11 the end plates 12 and 13 are secured in place by means of vertical retaining screws which extend upwardly through the base portion of the member 11. The guard plate is thus locked in position by the end plates.

The guard plate 14 has a flat upper surface divided longitudinally by a narrow U-shaped corrugation or valley 16 and it is transversely slotted to provide a long series of stationary shear teeth 15. The slots forming these teeth extend through the upper face of the guard plate but do not reach the upper face of the valley 16 so that the latter remains solid metal. This construction substantially stiffens the guard plate both transversely and longitudinally and permits the employment of thinner steel therein than would otherwise be expedient. This, as already noted, contributes to the close cutting of the implement by reducing the thickness of the guard plate material interposed beween the face of the user and the shearing plane.

Figure 3:
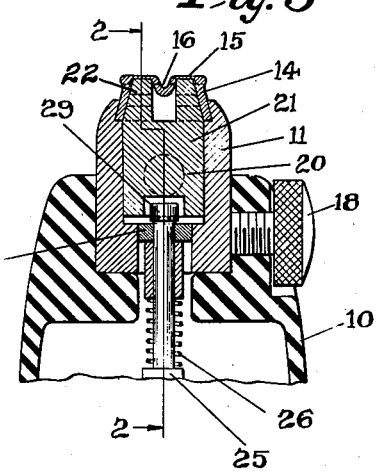
Fig. 3 is a view in central cross-section on the line 3—3 of Fig. 1.
Figure 4:
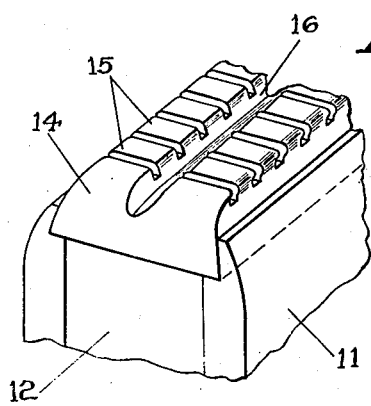
Fig. 4 is a fragmentary view in perspective of the implement.

The cutter of the implement comprises two separate short sections 20 and 21 conforming in contour to the interior dimensions of the member 11 and fitting beneath the guard plate 14. Each cutter section has a pair of parallel longitudinal upstanding flanges spaced from each other by the width of the corrugation 16 of the guard plate, as shown best in Fig. 3. The flanges of the cutter sections are transversely slotted to form a series of transverse shearing teeth 22 and 23, respectively.

The cutter sections 20 and 21 are supported in yielding engagement with the inner face of the guard plate by rounded projections extending upwardly from a supporting plate 27 having a downwardly extending hub 28 through which extends a reduced extension of the motor shaft 25. A compression spring 26 bearing against the lower end of the hub 28 tends always to lift the supporting plate 27 and hold the cutter sections above it in yielding engagement with the shear teeth 22 of the guard plate 14.

In the meeting edges of the bottom portion of each cutter section is formed a semi-circular recess and in these is received a rotary eccentric or cam 29 having a 90° throw therein. Compression springs 30 and 31 located respectively in the cutter sections 20 and 21 engage the end plates 12 and 13 and tend to move the cutter sections inwardly to a central position determined by the concentric portion of the cam 29 which thus serves as a gauge to determine the initial open position of the movable cutter sections. When in this positon the teeth 22 and 23 of the cutter sections register with the teeth 22 of the guard plate. The slots therefore, are fully open and may freely receive hairs as the implement is moved over the face of the user. On the other hand, as the motor shaft 25 is rotated first one and then the other cutter section is moved outwardly against the compression of the spring 30 or 31 and its teeth are moved into shearing motion with the teeth 15 in one side or the other of the guard plate. The timing and design of the cam 29 is such that each cutter section remains in its inner position for three-quarters of each cycle so that the shearing teeth remain wide open most of the time and are closed only during the quick shearing throw of the cutter section. Moreover, while one half the guard is closed the other half remains open.

The slots of the guard plate 14 extend a short distance down into its side walls and the teeth of the cutter conform to the inner contour of the slotted portion of the guard plate. Accordingly, the shearing operation takes place at the side edges as well as the top edge of the cutter teeth 22.

Having thus disclosed my invention and described a specific embodiment thereof for purposes of illustration and not limitation, I claim as new and desire to secure by Letters Patent:

1. A dry shaving implement having a guard plate with a series of uniformly spaced shearing teeth therein all lying in a common plane, in co-operation with two separate independently movable cutter sections located in end to end relation, having similarly spaced teeth and being arranged for alternate movement from open to shearing position.

2. A dry shaving implement having a guard plate with a series of uniformly spaced shearing teeth which lie in a single plane therein, in co-operation with two separate independently movable cutter sections located in end to end relation having spaced teeth, means tending at all times to move the sections into open position, and means for moving the sections alternately into shearing position.

3. A dry shaving implement having a guard plate with a longitudinal series of spaced shearing teeth all lying in a common plane therein, in co-operation with two short cutter sections arranged in end to end relation, means for gauging the sections in open position at the inner end of their respective paths of movement and for moving one section after the other outwardly to shearing position.

4. A dry shaving implement having an outer stationary member with spaced shearing teeth all lying in a common plane and an internal guideway therein, in co-operation with separate cutter sections movable therein, arranged in end to end relation and having spaced shearing teeth, springs tending to position the cutter sections in open position, and driving mechanism for intermittently moving the sections to shearing position.

5. A dry shaving implement having an outer stationary member with spaced shearing teeth, a plurality of underlying cutter sections separated transversely from each other, a rotary cam having a relatively short throw arranged to move the cutter sections into shearing position, and for gauging the cutter sections in open position with respect to the teeth of the outer member.

6. A dry shaving implement having a hollow outer member with shearing teeth in its upper face, a cutter comprising two parts movable relatively to each other within said member, a shaft carrying a cam in operative engagement with the cutter parts, an underlying supporting plate for the parts of the cutter movable upon the shaft and a spring acting on said plate for pressing the cutter parts toward the shearing teeth.

7. A dry shaving implement having an outer shear member with spaced teeth, an inner shear member with correspondingly spaced teeth, spring means normally maintaining said members with the spaces between their respective teeth in registration, and power operated means including a rotary cam for imparting a shearing stroke to one of the members in a short period of the operating cycle.

8. A dry shaving implement having an outer shear member with spaced teeth all of which lie in a common plane, an inner sectional shear member comprising a plurality of sections divided transversely one from another, and located beneath areas of the spaced teeth of the outer member, and eccentric means for operating the sections thereof to effect the shearing operation successively in different areas of the outer shear member.

9. A dry shaving implement having a guard provided with spaced shearing teeth all lying in a common plane, two separate cutter sections provided with spaced shearing teeth movably mounted within the guard in end to end relation, spring means acting to hold the spaces of the cutter sections in registration with the spaces of the guard, and power operated means for imparting a shearing stroke to one cutter section after the other.

10. A dry shaving implement having a hollow guard with shearing teeth in its face, two separate elongated cutter sections mounted in end-to-end relation within the guard for relative movement, a spring-actuated carrier plate movable to press both cutter sections against the guard, and power operated means for actuating one of the cutter sections while the other remains at rest.

11. A dry shaving implement having a stationary member presenting a long series of transverse shearing teeth all lying in a single plane, two short cutter sections having transverse shearing teeth and each cooperating with an opposite end portion of said long series, and operating mechanism for separately moving said short cutter sections.

JOHN H. HILL.